US00RE50659E

(19) United States
(12) Reissued Patent
Muscato

(10) Patent Number: US RE50,659 E
(45) **Date of Reissued Patent: *Nov. 11, 2025**

(54) FLAT HAIR CLIP

(71) Applicant: Teleties, LLC, Maitland, FL (US)

(72) Inventor: Lindsay Muscato, Maitland, FL (US)

(73) Assignee: Teleties, LLC, Maitland, FL (US)

( * ) Notice: This patent is subject to a terminal disclaimer.

(21) Appl. No.: 29/989,577

(22) Filed: Feb. 13, 2025

Related U.S. Patent Documents

Reissue of:
(64) Patent No.: Des. 1,031,161
Issued: Jun. 11, 2024
Appl. No.: 29/926,096
Filed: Jan. 29, 2024

U.S. Applications:
(62) Division of application No. 29/989,558, filed on Feb. 13, 2025, which is an application for the reissue of Pat. No. Des. 1,031,161.

(51) LOC (15) Cl. ..... 28-03
(52) U.S. Cl.
USPC ..... D28/40
(58) Field of Classification Search
USPC ..... D28/10, 39, 40, 41, 42, 43
CPC ..... A45D 8/00; A45D 8/001; A45D 8/002; A45D 8/02; A45D 8/14; A45D 8/20; A45D 8/22; A45D 8/24; A45D 8/26; A45D 8/28; A45D 8/30; A45D 8/32; Y10T 24/44; Y10T 24/44923
See application file for complete search history.

(56) References Cited

U.S. PATENT DOCUMENTS

| | | | | |
|---|---|---|---|---|
| 5,605,166 | A * | 2/1997 | Chou | A45D 8/30 132/277 |
| D393,927 | S * | 4/1998 | Chou | D28/42 |
| D393,928 | S * | 4/1998 | Chou | D28/42 |
| D410,302 | S | 5/1999 | Yasuda | |
| 6,446,639 | B1 * | 9/2002 | Shyu | A45D 8/20 132/277 |
| D473,015 | S | 4/2003 | Shyu | |
| D540,982 | S * | 4/2007 | Vergona | D28/40 |
| D566,895 | S * | 4/2008 | Vergona | D28/40 |
| D580,103 | S * | 11/2008 | Pichon | D28/39 |
| D590,102 | S * | 4/2009 | Hsu | D28/39 |
| D637,348 | S | 5/2011 | Richmond et al. | |
| 7,992,579 | B2 * | 8/2011 | Longoria | A45D 8/20 132/279 |
| 9,072,355 | B1 | 7/2015 | Magnani | A45D 8/24 |
| D737,510 | S | 8/2015 | Wright et al. | |
| D794,870 | S * | 8/2017 | Hsu | D28/40 |
| D829,990 | S | 10/2018 | Hsu | |
| D901,080 | S * | 11/2020 | Hsu | D28/40 |
| D917,782 | S | 4/2021 | Chu | A45D 8/30 D28/42 |
| D960,447 | S | 8/2022 | Carter | D28/20 |
| 11,497,289 | B2 * | 11/2022 | Hsu | A45D 8/22 |
| D981,643 | S | 3/2023 | Chen | D28/40 |
| D982,235 | S * | 3/2023 | Chen | D28/40 |
| D982,827 | S * | 4/2023 | Chen | D28/40 |
| D1,002,104 | S | 10/2023 | Cai | D28/40 |
| D1,006,324 | S | 11/2023 | Zhou | |
| D1,031,161 | S * | 6/2024 | Muscato | D28/40 |
| D1,068,163 | S * | 3/2025 | Liu | D28/39 |
| D1,075,147 | S * | 5/2025 | Muscato | D28/40 |

FOREIGN PATENT DOCUMENTS

| | | | |
|---|---|---|---|
| CN | 307007035 | | 12/2021 |
| CN | 307013072 | * | 12/2021 |
| CN | 307037790 | S | 12/2021 |
| CN | 307037792 | | 12/2021 |
| CN | 307409779 | * | 6/2022 |
| CN | 307502404 | * | 8/2022 |
| CN | 307728067 | * | 12/2022 |
| CN | 307850270 | * | 2/2023 |
| CN | 307881540 | * | 2/2023 |
| CN | 307881541 | | 2/2023 |
| GB | 6180944 | | 12/2021 |
| GB | 6180949 | | 12/2021 |
| GB | 6224102 | | 9/2022 |

OTHER PUBLICATIONS

French Small Open Rectangle Tort Crock—Pair [online], URL: <https://www.gladhair.com/collections/alligator-hair-clips/products/small-open-rectangle-tort-crock-pair>. [Retrieved from the internet on Mar. 4, 2024].

(Amended)

RC Roche Ornament [online], [publication date is Aug. 14, 2020]. [Retrieved from the internet on Mar. 13, 2024]. URL: <https://www.amazon.com/RC-ROCHE-ORNAMENT-Comfortable-Multicolor/dp/B07XQ5PHTH/ref>. (Year: 2020)., Aug. 14, 2020.
Flat Claw Clips [online], [publication date is Nov. 20, 2023]. [Retrieved from the internet on Mar. 13, 2024]. URL: <https://www.amazon.com/Ahoney-Alligator-Styling-Accessories-Neutral/dp/B0CMYJRFJZ/ref>. (Year: 2023)., Nov. 20, 2023.
"Crown Guide Hair Claw Clips", Crown Guide Hair Claw Clips [online], [publication date is Mar. 23, 2022]. [Retrieved from the internet on Mar. 13, 2024]. URL: <https://www.amazon.com/Crownguide-Womens-Crystal-Plastic-Accessory/dp/B08BNFYHM7/ref>. (Year: 2022)., Mar. 23, 2022.
4 Pcs Small Flat Hair Clips [Onl , "4 Pcs Small Flat Hair Clips [online]", https:// www.amazon.com/Non-slip-Resilient-Everyday-Accessory-Accessories/dp/B0CGWLVZB3/ref, Feb. 19, 2024.
Duckbill Claw Clip , "Duckbill Claw Clip", https://www.shopandi.com/products/duckbill-claw-clip?variant=40447102091379.
Flat Lay Claw Clip , "Flat Lay Claw Clip", https://www.mykitsch.com/products/rabs-flat-lay-claw-clip-2pc-flat-black-tort?pr_prod_strat=jac&pr_rec_id=d23ee67c4&pr_rec_pid=7319130079413&pr_ref_pid=7285782315189&pr_seq=uniform.
Kaxi Lay Down Claw 2.0 , "Kaxi Lay Down Claw 2.0", https://www.shopkaxi.com/collections/all-products/products/kaxi-lay-down-claw-2-1.
Lay Down Claw Clip , "Lay Down Claw Clip", https://blissandbelleboutique.com/products/lay-down-claw-clip?pr_prod_strat=e5_desc&pr_rec_id=dc12661eb&pr_rec_pid=6923209080855&pr_ref_pid=6940501508119&pr_seq=uniform.
Parcelona [Online] , "Parcelona [online]", https://www.amazon.com/ Parcelona-France-Celluloid-Tortoise-Clutcher/dp/B00QAPFPLI/ref, May 18, 2018.
RC Roche Ornament [online], [publication date is Jan. 13, 2023]. [Retrieved from the internet on Apr. 9, 2024]. URL: <https://www.amazon.com/RC-ROCHE-ORNAMENT-Comfortable-Multicolor/dp/B07XQ5PHTH/ref>. (Year: 2023) .*
4 Pcs Small Flat Hair Clips [online], [publicaiton date is Feb. 19, 2024]. [Retrieved from the internet on Apr. 9, 2024]. URL: <https://www.amazon.com/Non-slip-Resilient-Everyday-Accessory-Accessories/dp/B0CGWLVZB3/ref>. (Year: 2024).*
Parcelona [online], [publication date is May 18, 2018]. [Retrieved from the internet on Apr. 9, 2024]. URL: <https://www.amazon.com/Parcelona-France-Celluloid-Tortoise-Clutcher/dp/B00QAPFPLI/ref>. (Year: 2018).*
Tele_ties—The new Teleties Flat Round Clip [online], [publication date is Nov. 7, 2023]. [Retrieved from the internet on Apr. 9, 2024]. URL:<https://www.instagram.com/p/CzXMvkiN_C_/?hl=en>. (Year: 2023).*
Teleties—Small Flat Round Clip [online], [publication date is Dec. 23, 2023]. [Retrieved from the internet on Apr. 9, 2024]. URL: <https://www.amazon.com/TELETIES-Bendable-Comfortable-Thin-Medium-Textures/dp/B0CV2GMSR8/ref>. (Year: 2023).*
Bora Bora Large Flat Round Hair Clip [online], [publication date is Apr. 9, 2024]. [Retrieved from the internet on Apr. 9, 2024]. URL: <https://www.teleties.com/products/bora-bora-large-flat-round-hair-clip>. (Year: 2024).*
Product: Kaxi Lay Down Claw 2.0 (8 Colors) , [online]. URL: https://www.shopkaxi.com/collections/all-products/products/kaxi-lay-down-claw-2-1>. Date last accessed: Mar. 4, 2024.
Product: Duckbill Claw Clip—Multiple Colors, [online]. URL: <https://www.shopandi.com/products/duckbill-claw-clip?variant=40447102091379>. Date last accessed: Mar. 4, 2024.
Product: Lay Down Claw Clip: [online]. URL: <https://blissandbellebotique.com/products/lay-down-claw-clip?pr_prod_start=e5_desc&pr_rec_id=dc12661eb&pr_rec_pid=6923209080855&pr_ref_pid=6940501508119&pr_seq=uniform>. Date Last Accessed: Mar. 4, 2024.
Product: Flat Lay Claw Clip 2pc—Black & Tort, [online]. URL: <https://www.mykitsch.com/products/rabs-flat-lay-claw-clip-2pc-flat-black-tort?pr_prod_strat=jac&pr_rec_id=d23ee67c4&pr_rec_pid=7319130079413&pr_ref_pid=7285782315189&pr_seq=uniform>. Date Last Accessed: Mar. 4, 2024.

* cited by examiner

*Primary Examiner* — Darlington Ly
(74) *Attorney, Agent, or Firm* — Hill Ward Henderson, P.A.; Stephen E. Kelly; Andriy Lytvyn

(57) CLAIM

The ornamental design for a flat hair clip, as shown and described.

DESCRIPTION

*More than one reissue application has been filed for the reissue of U.S. Design Pat. No. D1,031,161. The reissue applications are application No. 29/989,558; and application Nos. 29/989,569 and 29/989,577 (the present application), both of which are divisional reissues of U.S. Design Pat. No. D1,031,161.*
*The present application is a reissue of U.S. Design Pat. No. D1,031,161, issued on Jun. 11, 2024, the entire disclosure of which is expressly incorporated herein by reference.*
[FIG. 1 is a perspective view of a first embodiment of a flat hair clip according to the present design.]
[FIG. 2 is a front elevation view thereof.]
[FIG. 3 is a rear elevation view thereof.]
[FIG. 4 is a left side elevation view thereof.]
[FIG. 5 is a right side elevation view thereof.]
[FIG. 6 is a top view thereof.]
[FIG. 7 is a bottom view thereof.]
[FIG. 8 is a perspective view of a second embodiment of a flat hair clip according to the present design.]
[FIG. 9 is a front elevation view thereof.]
[FIG. 10 is a rear elevation view thereof.]
[FIG. 11 is a left side elevation view thereof.]
[FIG. 12 is a right side elevation view thereof.]
[FIG. 13 is a top view thereof.]
[FIG. 14 is a bottom view thereof.]
FIG. 15 is a perspective view of [a third embodiment of] a hair clip [with open sides] according to the present design.
FIG. 16 is a front elevation view thereof.
FIG. 17 is a rear elevation view thereof.
FIG. 18 is a left side elevation view thereof.
FIG. 19 is a right side elevation view thereof.
FIG. 20 is a top view thereof; and,
FIG. 21 is a bottom view thereof.
*The broken lines in the drawings depict portions of the flat hair clip that form no part of the claimed design.*

1 Claim, 7 Drawing Sheets

Matter enclosed in heavy brackets [ ] appears in the original patent but forms no part of this reissue; matter printed in italics indicates the additions made by reissue.

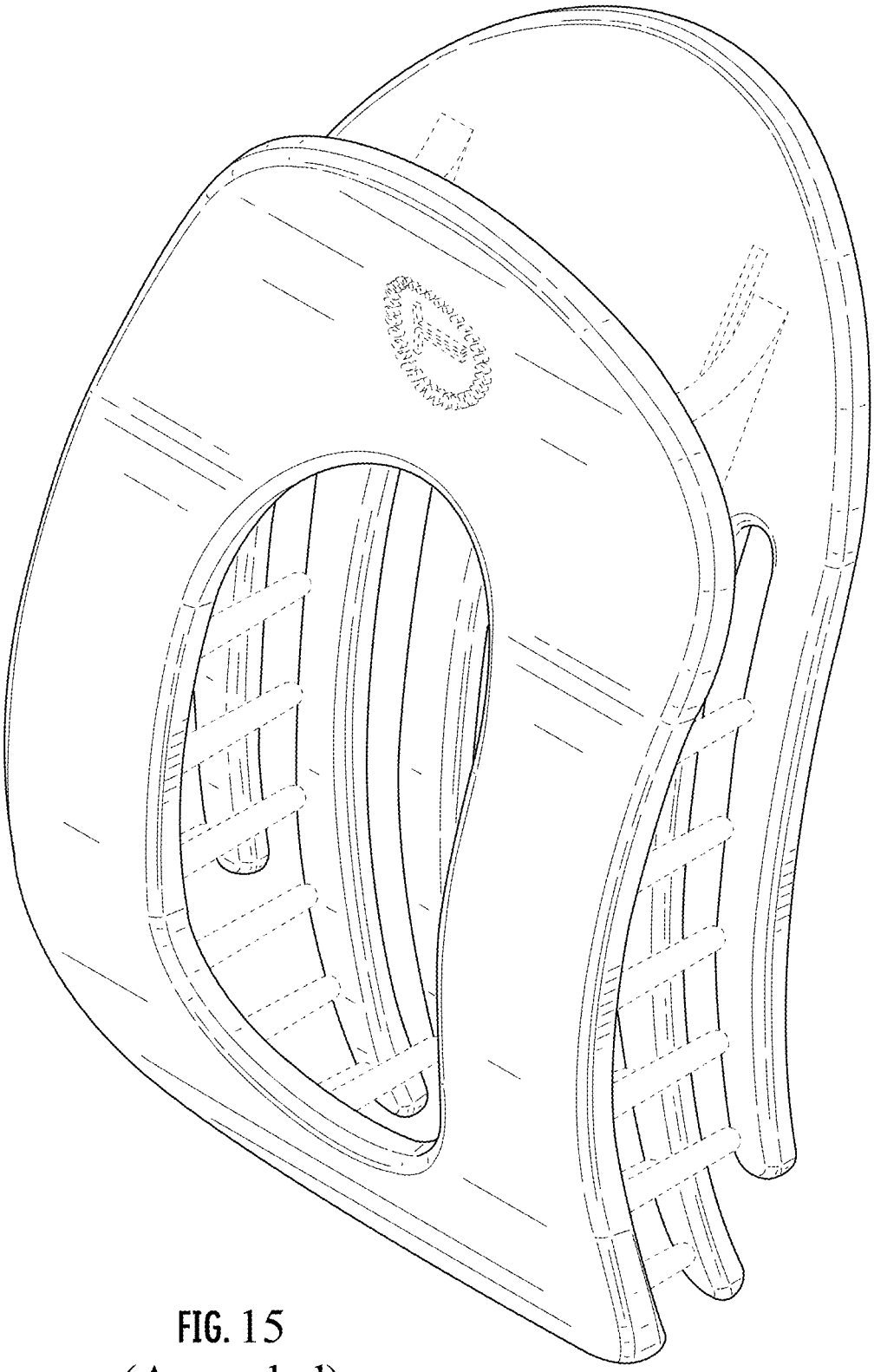
FIG. 15
(Amended)

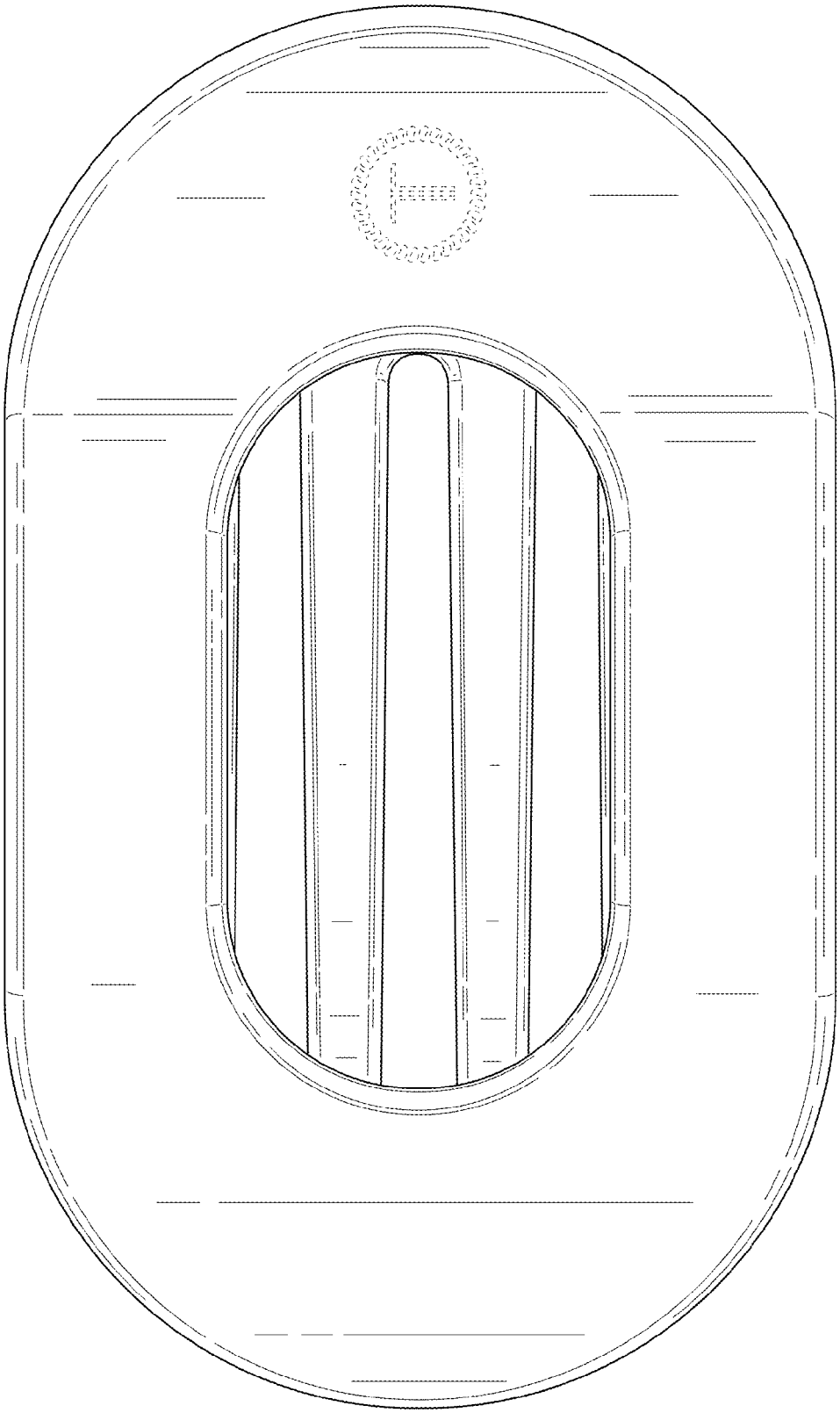
FIG. 16
(Amended)

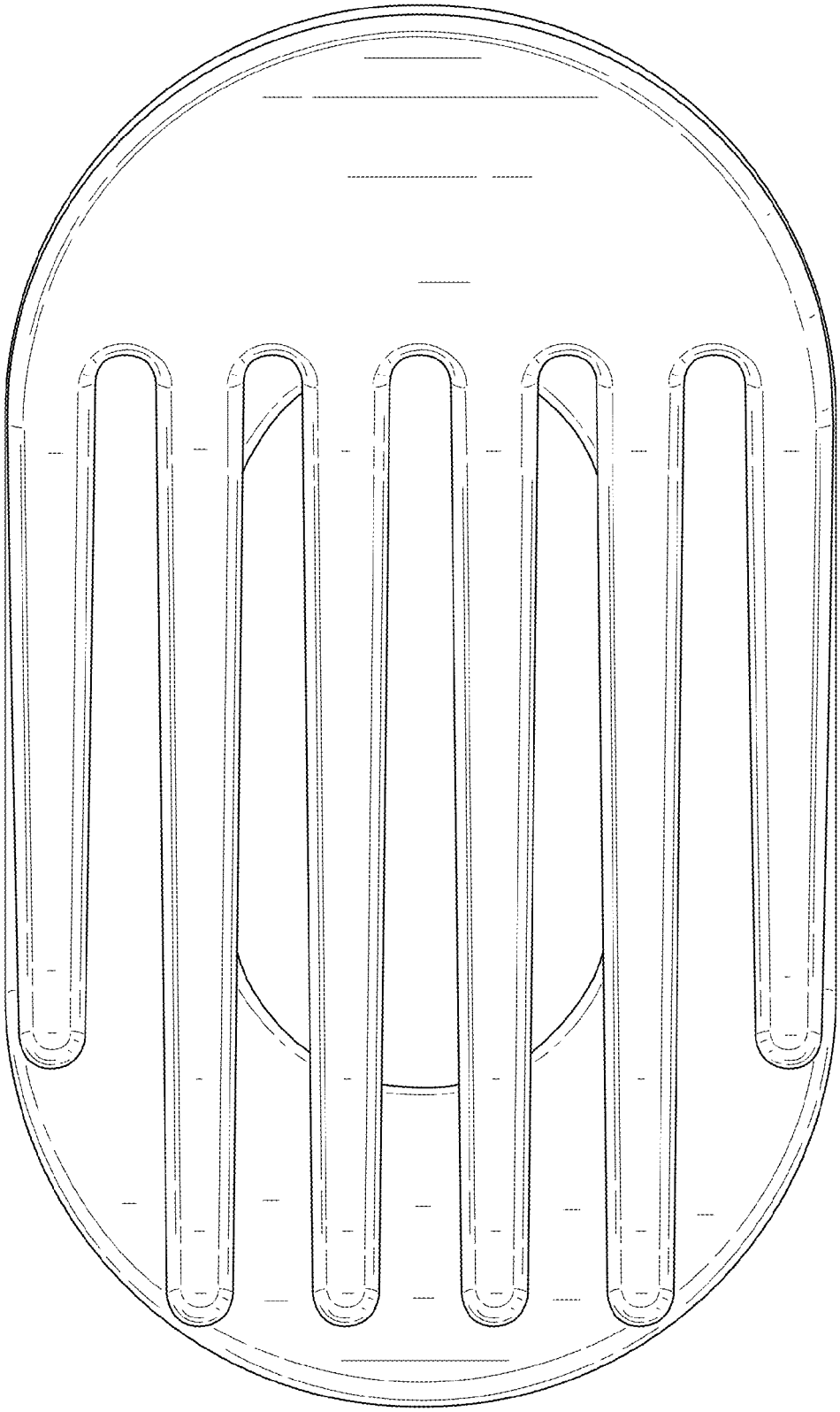
FIG. 17
(Amended)

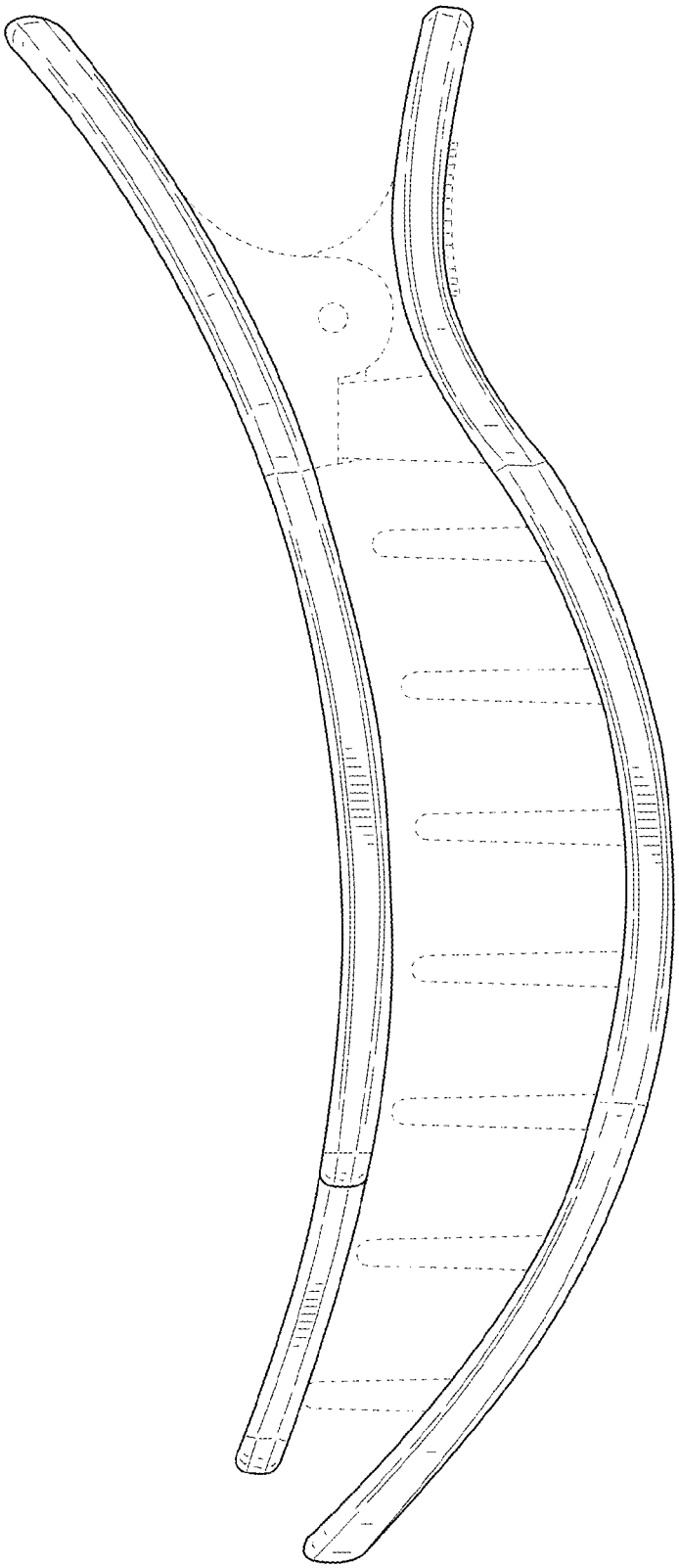
FIG. 18
(Amended)

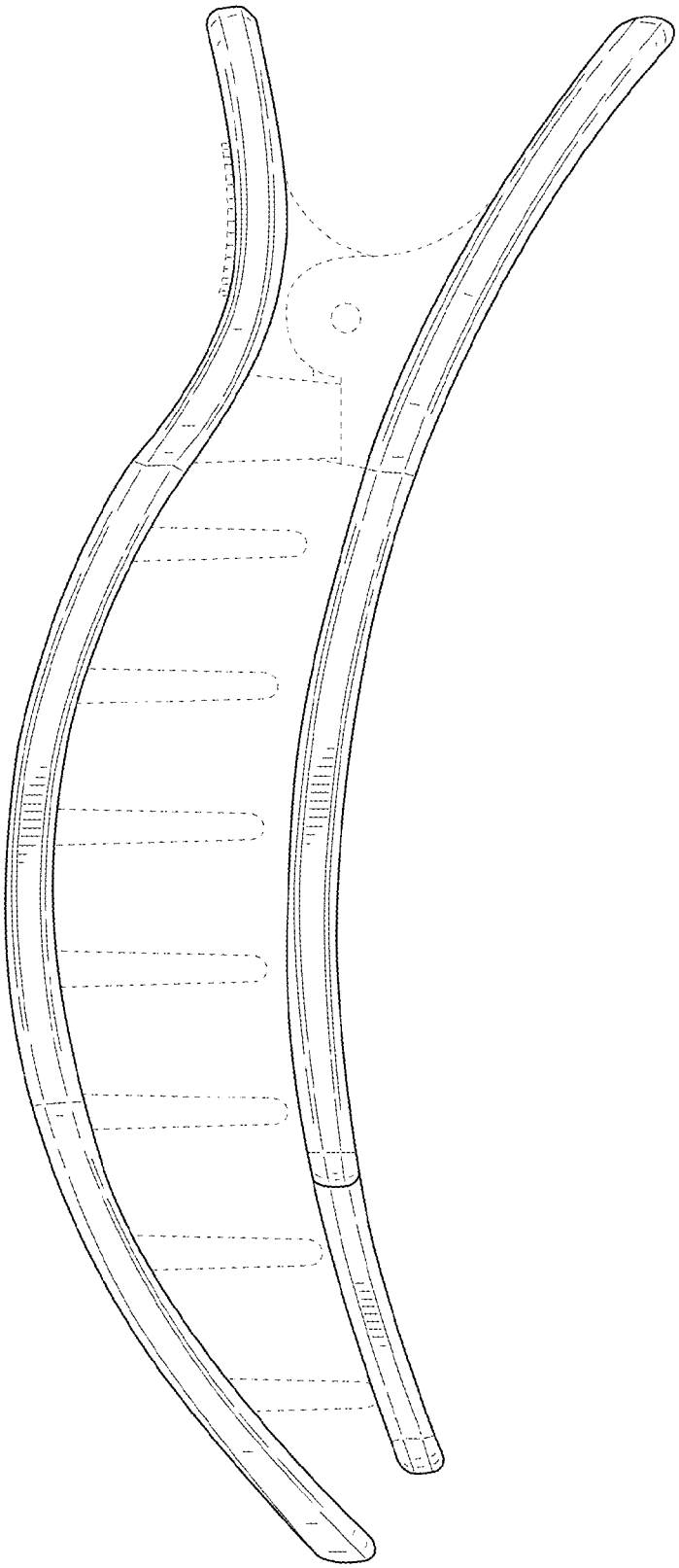
FIG. 19
(Amended)

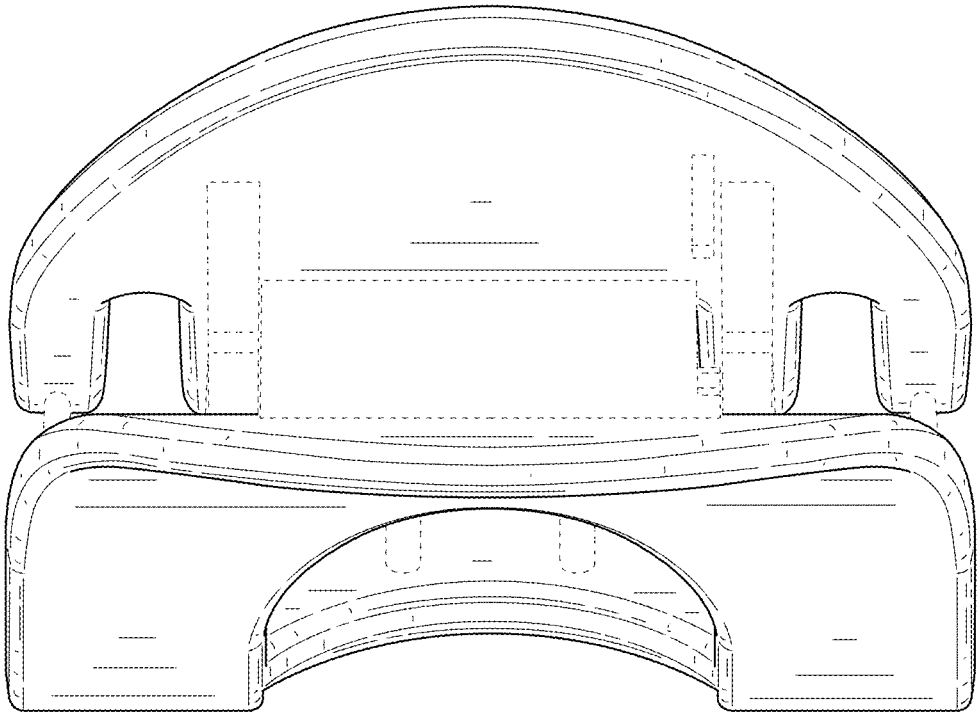
FIG. 20
(Amended)

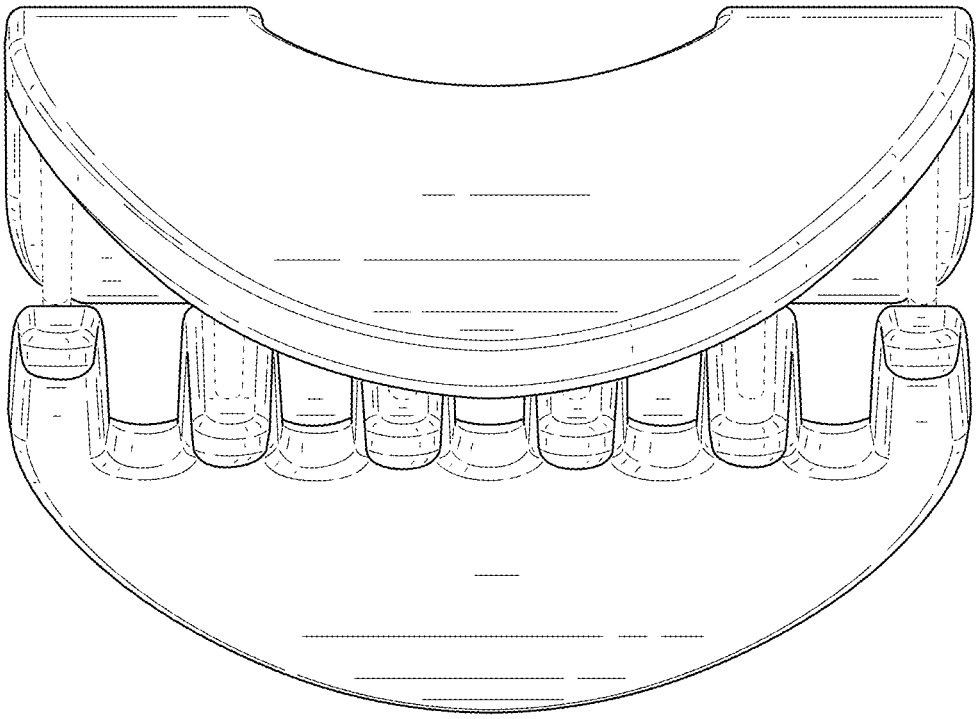
FIG. 21
(Amended)